United States Patent
Relion et al.

(10) Patent No.: US 9,640,902 B2
(45) Date of Patent: May 2, 2017

(54) STRESS RELIEF DEVICE FOR A CONNECTOR AND A CONNECTOR EQUIPPED WITH SUCH STRESS RELIEF DEVICE

(71) Applicant: Sercel, Carquefou (FR)

(72) Inventors: Thibault Relion, Saint Gaudens (FR); Johann Dabouineau, Villeneuve De Riviere (FR)

(73) Assignee: Sercel, Carquefou (FR)

( * ) Notice: Subject to any disclaimer, the term of this patent is extended or adjusted under 35 U.S.C. 154(b) by 0 days.

(21) Appl. No.: 14/755,902

(22) Filed: Jun. 30, 2015

(65) Prior Publication Data
US 2016/0006169 A1    Jan. 7, 2016

(30) Foreign Application Priority Data

Jul. 3, 2014   (EP) ..................................... 14306085

(51) Int. Cl.
*H01R 13/58*   (2006.01)
*G01V 1/20*    (2006.01)
(Continued)

(52) U.S. Cl.
CPC ............ *H01R 13/58* (2013.01); *G01V 1/202* (2013.01); *H01R 13/52* (2013.01); *H01R 13/627* (2013.01);
(Continued)

(58) Field of Classification Search
CPC ................................................ H01R 13/5845
(Continued)

(56) References Cited

U.S. PATENT DOCUMENTS 4,005,922 A * 2/1977 Burkhart ............. H01R 13/512
439/465
4,500,980 A   2/1985 Copeland
(Continued)

FOREIGN PATENT DOCUMENTS

EP   2354825 A1   8/2011
EP   2520950 A1   11/2012

OTHER PUBLICATIONS

European Search Report and Written Opinion dated Dec. 10, 2014 for corresponding European Patent Application No. 14306085, filed Jul. 3, 2015.
(Continued)

*Primary Examiner* — Phoung Dinh
(74) *Attorney, Agent, or Firm* — Ipsilon USA, LLP

(57) ABSTRACT

A stress relief device is provided for a connector. The connector is connected to a cable and configured for cooperating with a complementary connector along a longitudinal axis. The stress relief device includes: an anchor configured for being placed around a portion of the cable so as to allow a stress relief of the portion of the cable, the portion of the cable being adjacent to the connector; a shell configured for being connected to the anchor and for at least partially wrapping the connector; and a locking system configured for connecting and locking the shell to a similar shell of a similar stress relief device for the complementary connector. The stress relief device is detachably mountable on the connector and is configured such that its mounting/dismounting does not require any change in the connection/disconnection of the connectors to one another.

19 Claims, 9 Drawing Sheets

Figure 1A:
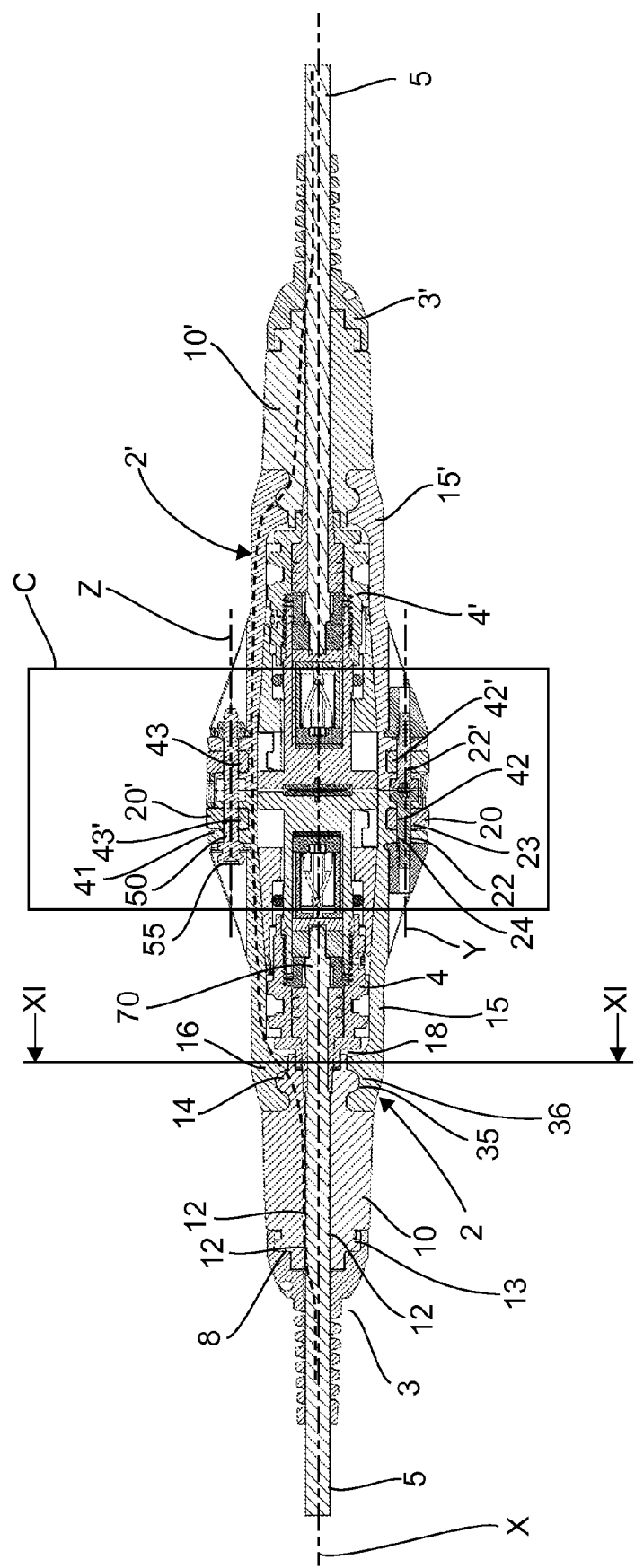

(51) Int. Cl.
    *H01R 13/52*    (2006.01)
    *H01R 13/627*   (2006.01)
    *H01R 43/26*    (2006.01)
    *H01R 13/639*   (2006.01)
    *H01R 13/523*   (2006.01)
(52) U.S. Cl.
    CPC ........... *H01R 13/639* (2013.01); *H01R 43/26* (2013.01); *H01R 13/523* (2013.01)
(58) Field of Classification Search
    USPC ........................................ 439/470, 472, 474
    See application file for complete search history.

(56) References Cited

U.S. PATENT DOCUMENTS

| | | | |
|---|---|---|---|
| 4,648,670 A * | 3/1987 | Punako | H01R 13/622 285/319 |
| 4,682,831 A | 7/1987 | McNeel et al. | |
| 4,964,815 A * | 10/1990 | Kawai | H01R 13/512 439/607.25 |
| 6,083,053 A * | 7/2000 | Anderson, Jr. | H01R 23/27 439/652 |
| 6,196,865 B1 * | 3/2001 | Ruffel | H01R 13/56 439/470 |
| 6,786,297 B1 | 9/2004 | Menard | |
| 6,786,767 B1 | 9/2004 | Fuks et al. | |
| 2003/0100215 A1 | 5/2003 | Bachman | |
| 2005/0266714 A1 | 12/2005 | Higgins et al. | |
| 2007/0111563 A1 | 5/2007 | Chang et al. | |

OTHER PUBLICATIONS

United Kingdom Search Report dated Nov. 25, 2015 for corresponding GB Patent Application No. 1511781.5.

* cited by examiner

STRESS RELIEF DEVICE FOR A CONNECTOR AND A CONNECTOR EQUIPPED WITH SUCH STRESS RELIEF DEVICE

1. FIELD OF THE DISCLOSURE

The present disclosure relates to the cabled systems with connectors especially for geophysical equipment, e.g. for oil prospection, and more generally to any cabled system used in a harsh environment inducing stresses and requiring water-tightness of the cabled system.

More specifically, the disclosure relates to seismic data acquisition systems including a cabled network with connectors, connected to a central processing unit, in any field implementing a seismic data acquisition, but the disclosure may be applied to any application that requires stress relief for a connector connected to a cable.

One particular application of the disclosure relates to land seismic data acquisition systems, wherein seismic data acquisition operations conventionally use networks of electronic units whereto geophysical (or seismic) sensors are connected.

2. TECHNOLOGICAL BACKGROUND

These sensors, referred to using the term geophones, are generally interconnected in groups of sensors by cables to form clusters referred to as "strings". One or a plurality of these strings are connected to the electronic units.

In order to collect the geophysical data, one or a plurality of seismic sources in contact with the ground are activated to propagate omnidirectional seismic wave trains, which are reflected by the layers of the subsurface, and detected by the sensors. The sensors generate a digital or an analogue signal characterising the reflection of the waves on the geological interfaces of the subsurface, which is sent to the electronic units.

When sensors are analogue, the electronic units perform the analogue to digital conversion (ADC) of the signal from the groups of sensors.

The electronic units then send the data with the signals to a central data processing unit, which may be on-board a truck or boat, via possibly other electronic modules like concentrators, all parts of a cabled digital network.

Land seismic operations take place in different zones:
dry areas, with very low tensile stress, and for which the equipment including cables and electronic modules is required to have a water-tightness down to 1 m deep;
marsh areas, with low tensile stress and for which the equipment is required to have a high robustness and a water-tightness down to 5 m deep;
shallow water areas, with high tensile stress and bending stress, and for which the equipment is required to have high robustness and water-tightness up to 15 m deep.
Both marsh and shallow water areas are often referred to as transition areas.

Geophysical equipment is used in dry areas for about 95% of the land operations.

Each cable of the cabled system, or geophysical equipment, has several connectors for connecting portions of cables one to another. In case of getting through a transition area during a land operation, the connectors should be protected from tensile stress.

It is known, as a state of the art, to add a rope for joining together two points of a cable on each side of a connector, so that the length of the rope is shorter than the distance between the two points along the cable and the connector. Such a system of ropes creates a diversion for tensile stress through the rope, creating a stress relief in the connector and therefore protecting it.

A drawback of such a system with ropes is that the loop formed by the rope and the connector, which is quite big, might be hooked for example by underwater debris inducing tension. In such a case, the corresponding bending and/or tensile stress may then be communicated to the connector itself, then subject to more stresses than without any loop.

Furthermore, when retrieving the equipment on-board a ship or truck, the connectors can get stuck on an edge, producing a significant lever arm inducing bending on the connecting assembly. This stress is of particular severity for the connectors for which the state of the art with ropes is of no help.

Since a connector is rarely used in a transition area, the added constraint for the connector due to the ropes is not balanced by advantage most of the time.

3. SUMMARY

A particular embodiment of the disclosure proposes a stress relief device for a connector, said connector being assembled on an end of a cable and being configured for cooperating with a complementary connector along a longitudinal axis, said stress relief device including:
  an anchor configured for being placed around a portion of the cable so as to allow a stress relief of the portion of the cable, said portion of the cable being adjacent to the connector,
  a shell configured for being connected to the anchor and for at least partially wrapping the connector,
  a locking system configured for connecting and locking the shell to a similar shell of a similar stress relief device for the complementary connector,
said stress relief device being detachably mounted on the connector, the stress relief device being configured such that its mounting/dismounting does not require any change in the connection/disconnection of the connectors to one another.

Said stress relief device is therefore configured so that the stresses present in the cable essentially pass through the stress relief device, and more specifically, through the anchor, then through the shell of the stress relief device to the similar shell of the complementary stress relief device, and not through the connector, especially not through the mating parts of the connectors. With the stress relief device mounted on the connector, the mating parts of the connectors are not stressed. Furthermore, the water-tightness of the connector may be improved.

It is to be noted that even if most stresses pass through the stress relief device, a small proportion of the stresses, for example tensile stresses, may pass through the connectors, due for example to the friction between the connectors.

The stress relief device can be configured for being substantially indefinitely fitted on the connector and substantially indefinitely removed from the connector.

The stress relief device can advantageously be detachably mounted on the connector, said stress relief device being configured such that its mounting and dismounting does not cause any change in the connection or disconnection state of the connectors relative to one another.

In particular, when coupled to a stress relief device according to the present disclosure, the connector keeps all options for being plugged or unplugged with another complementary connector. In an embodiment, once the stress relief device is mounted with a similar stress relief device on two complementary connectors, these stress relief devices may be locked together independently from the actual plugging of the connectors. In a particular embodiment, the stress relief device can be detachably mounted on the connector while maintaining a coupled state of the connector with a complementary connector.

The operations of mounting and dismounting the stress relief device on and off the connector are advantageously made without any change in the connected or disconnected state of the connectors relative to each other.

This feature allows an operator, preferably without any particular tool, or only a screwdriver, to upgrade a standard connector for use in a transition area. For example, an operator mounts the stress relief device onto a connector used in a dry area during the operation taking place in a transition area, wherein the stress relief device becomes useful, so as to strengthen and protect the connector. Once the transition area is crossed and a dry area is reached, the stress relief device may be disassembled by the operator.

Thanks to the stress relief device of an embodiment of the disclosure, the assembly principle may be suitable for a quick upgrade of the connector(s) while maintaining the mating principles, especially the possible hermaphroditic coupling of the connectors.

It is to be noted that the shape of the stress relief device is preferably designed so as to pass easily over a truck edge or a boat edge, for example by creating neither hook nor loop.

The anchor includes for example two half-anchors, in particular two similar half-anchors, cooperating around the cable. This feature allows an easy assembly/disassembly of the anchor, without disassembling the connector from the cable. Screws may be provided for the clamping of the two half-anchors.

The anchor may be designed as a clamp pressing the cable.

The shell may include two half-shells cooperating around the connector. This feature allows an easy assembly/disassembly of the shell, without disassembling the connector from the cable.

When a stress relief device is mounted onto a connector, it is preferable that a similar stress relief device be mounted onto another connector that is complementary to the connector, also called the complementary connector, without requiring any change in the connection/disconnection of the connectors to one another.

In a particular embodiment, the connector includes a connector ring that ensures the mating to the complementary connector and the shell (in particular the two half-shells, if applicable) is (are) configured for being mounted in a rotationally fixed manner relative to the connector ring.

This may assure at least a 90° turn, that is required for the locking of the connection of the connector and the complementary connector, to be possibly made, even with the shell (and the similar shell) positioned onto the connectors. Thanks to this aspect of the disclosure, the locking of the connectors remains unchanged. It is to be noticed that the rotation may be higher than a 90° turn, for example up to 720° turn or even more.

The shell may include longitudinal hollow portions, respectively bump portions, configured for cooperating with longitudinal bump portions, respectively hollow portions, of the connector ring. This particular embodiment allows for example the shell to be rotationally fixed relative to the connector ring.

In a particular embodiment, the connector ring and the shell have a mechanical coding, in particular in form of a recess on the connector ring and in form of a corresponding projecting portion on the shell, or the contrary. This may ensure a correct positioning of the shell, i.e. of the half-shells, onto the connector ring.

The shell (in particular the two half-shells, if applicable) is(are) configured for creating an axial play between the shell and the connector, once the shell mounted on the connector. This axial play advantageously prevents any stress from transiting through the connector and the complementary connector. The forces transmitted through the anchor are therefore only transmitted to the shell and not to the connector and complementary connector.

The anchor may include an external surface having a shape, for example an external tore surface, and the shell may include an external surface having a complementary shape, for example a complementary hollow tore surface, so as to connect the shell to the anchor. The shape and the complementary shape are preferably configured so that the shell is free to rotate around the anchor while being freezed axially relative to the anchor. The tore surface and the complementary hollow tore surface are preferably placed perpendicular to the longitudinal axis, being advantageously symmetrical about the longitudinal axis.

In a particular embodiment, the locking system includes a locking half-ring, said locking half-ring being fastened to the shell and being mounted in a rotatable manner relative to the shell around a longitudinal axis in a periphery of the shell.

In this particular embodiment, the locking half-ring may include ramps on both lateral sides, so as to allow unlocking of the locking half-rings with a rotation of the device.

Still in this embodiment, the shell may include a peripheral groove for housing part of the locking half-ring of the stress relief locking system and part of the locking half-ring of the similar stress relief locking system. The locking half-ring includes for example at least two curved inwardly projected ribs, i.e. a first rib and a second rib, the first rib being configured for cooperating with the peripheral groove of the shell and for being fastened to the shell, and the second rib being configured for cooperating with the peripheral groove of the similar shell of the similar stress relief device, the ribs and grooves having complementary shapes.

In this embodiment, the shell may have a through opening in a lateral wall of the peripheral groove and the second rib may have a through opening, said through openings of the peripheral groove and of the second rib being configured for receiving for example a locking element of the locking system so as to lock the shell to the similar shell.

In such a case, the locking element may be chosen from the group constituted by a rod, a screw, a pin, an eccentric and similar devices.

The stress relief device and the similar stress relief device are advantageously identical devices. In particular, the stress relief device and the similar stress relief device have hermaphroditic properties.

According to another aspect, the present disclosure also provides a pair of stress relief devices as defined above.

According to another aspect, the present disclosure also provides a connector and a complementary connector with respectively a pair of stress relief devices as defined above.

According to another aspect, in combination with the above, the present disclosure also provides a connector equipped with a stress relief device as defined above, the connector including a connector body and a bend stiffener and being configured for connecting to a complementary connector, the bend stiffener being configured for being moved along the cable. The anchor of the stress relief device may be configured for being placed between the bend stiffener and the connector body and for cooperating with the bend stiffener.

Thanks to the stress relief device according to a particular embodiment, it is possible to use an existing connector for adapting a particular stress relief device thereon in order to reinforce the connector for an operation in a transition area, for example, as explained above.

It is to be noted that the stress relief device and the similar stress relief device may be configured so that an electrical connection between the connector and the complementary connector is made through the handling and mounting of the stress relief device and of the similar stress relief device on the connector and on the complementary connector, respectively, until a connection of the stress relief device to the similar stress relief device is realized. In particular, the disclosure provides an assembly of two plugged connectors for being equipped with respective stress relief devices having such a configuration.

Alternatively or preferably, for connectors equipped with stress relief devices, with a connection being made between the two connectors and between the two associated stress relief devices, the configuration may be such that disconnection of the stress relief devices implies a concomitant or (slightly) preceding disconnection of the connectors. The stress thereby is transferred to the stress relief device also during separation of the connectors.

Another aspect of the present disclosure relates to a method for adding a stress relief device as defined above to an existing connector, said connector being connected to a cable and being configured for cooperating with a complementary connector along a longitudinal axis, the connector including a connector body and a bend stiffener, the method including the following steps:
  pulling backwards the bend stiffener along the cable,
  assembling the anchor of the stress-relief device between the bend stiffener and the connector body,
  making the bend stiffener sliding forward so as to engage with the anchor,
  assembling the shell to the anchor and to the connector body, the locking system being fastened to the shell.

The method may also include the step consisting in connecting the connector to a complementary connector having the similar stress relief device, and the step consisting in locking the shell and the similar shell thanks to the locking systems of the stress relief devices.

The method preferably can be applied with the use of a screwdriver only.

Another aspect of the present disclosure relates to a method for dismounting a stress relief device as defined above from a connector as defined above, comprising the following steps:
  unlocking the locking system(s),
  dismounting the shell,
  dismounting the anchor,
  pulling forwards the bend stiffener so as to engage with the connector body.

4. LIST OF FIGURES

Figure 1B:
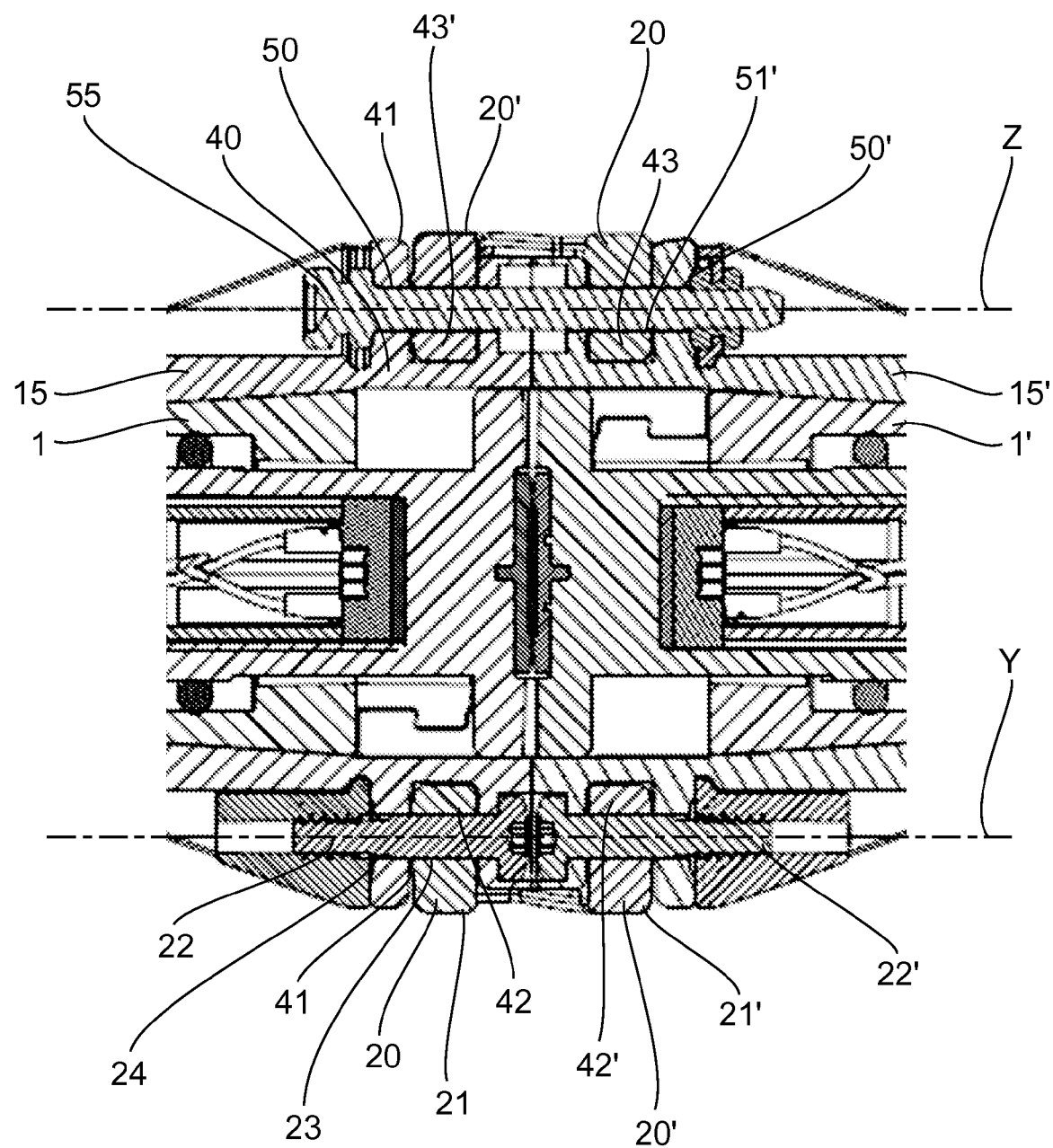
Figure 2:
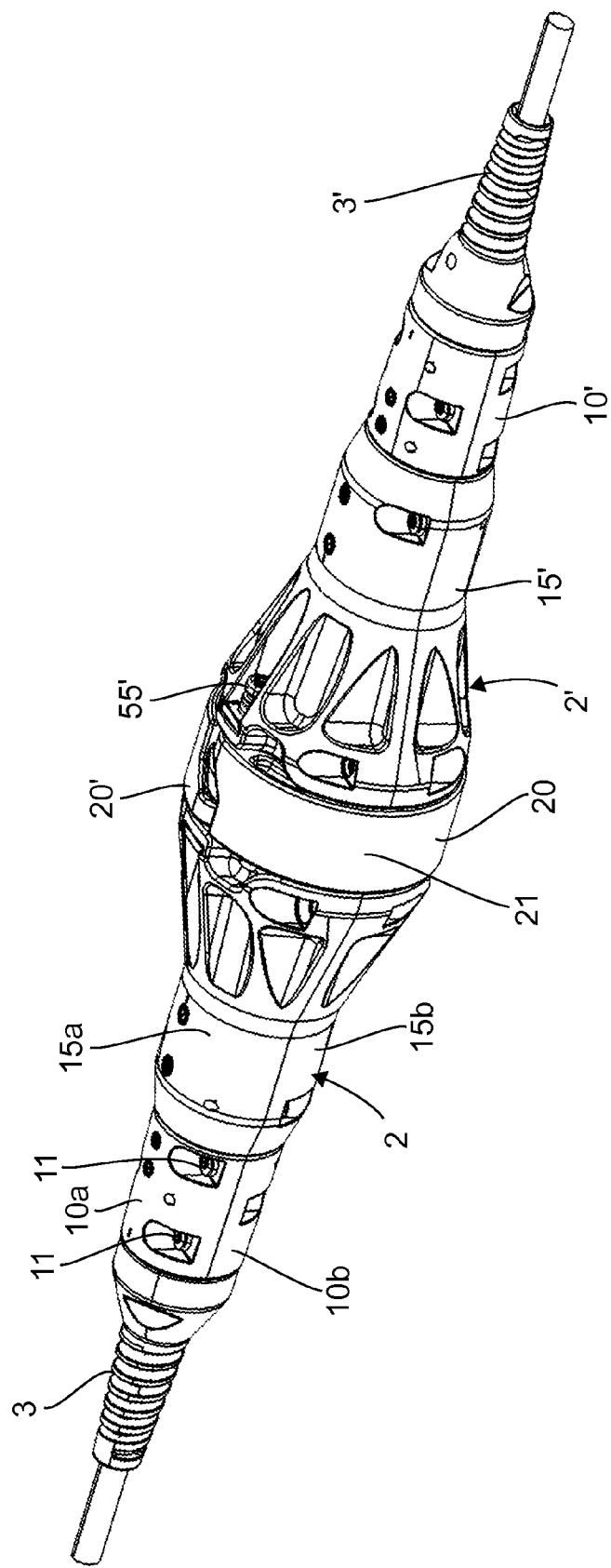
Figure 3:
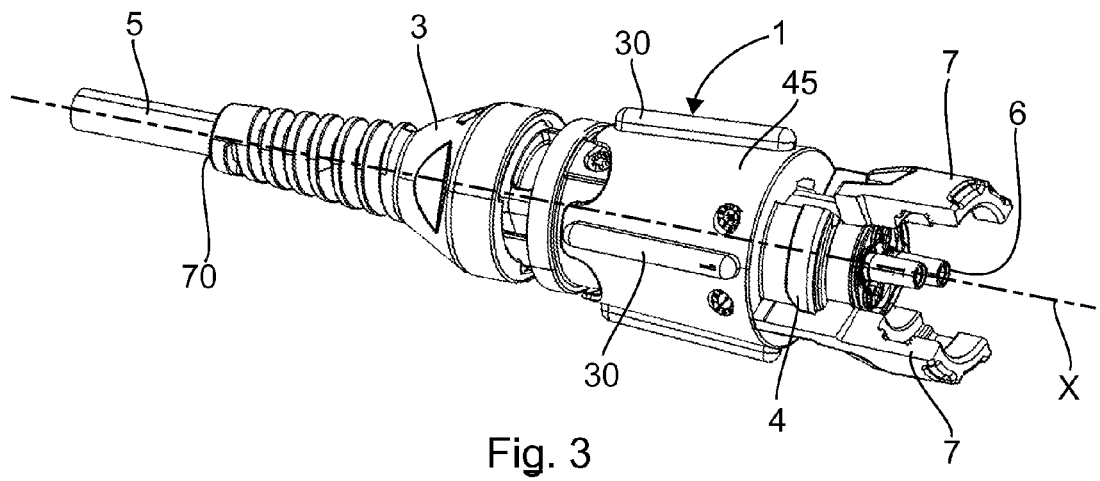
Figure 4:
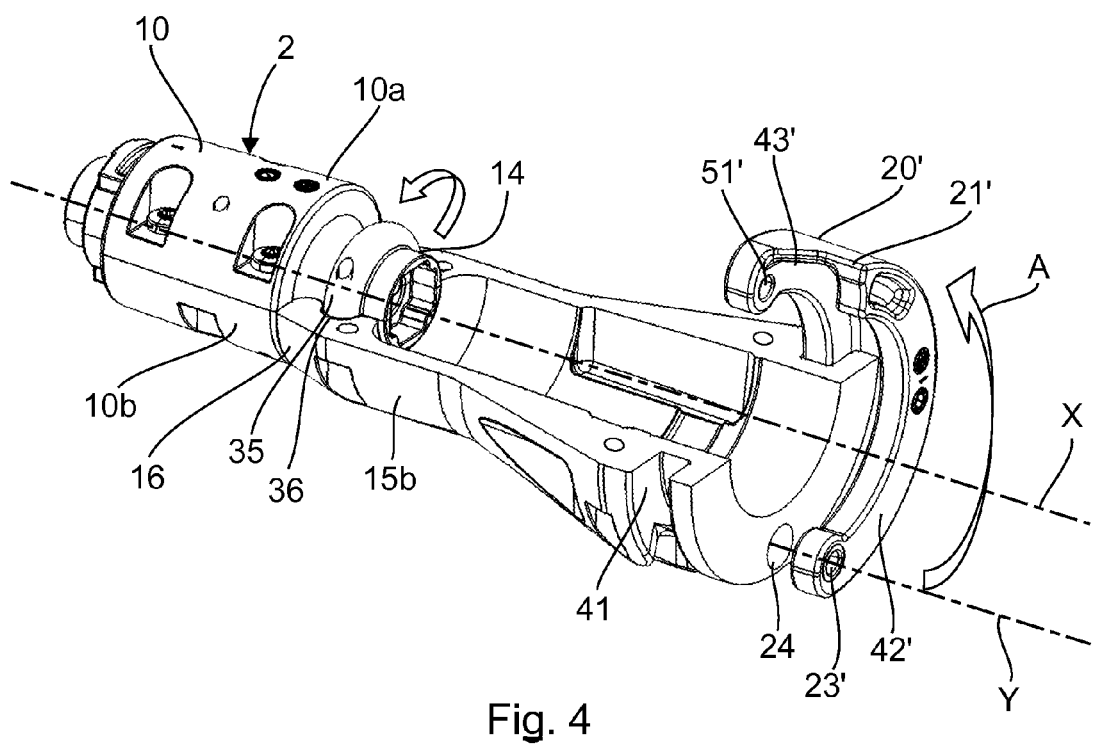
Figure 5:
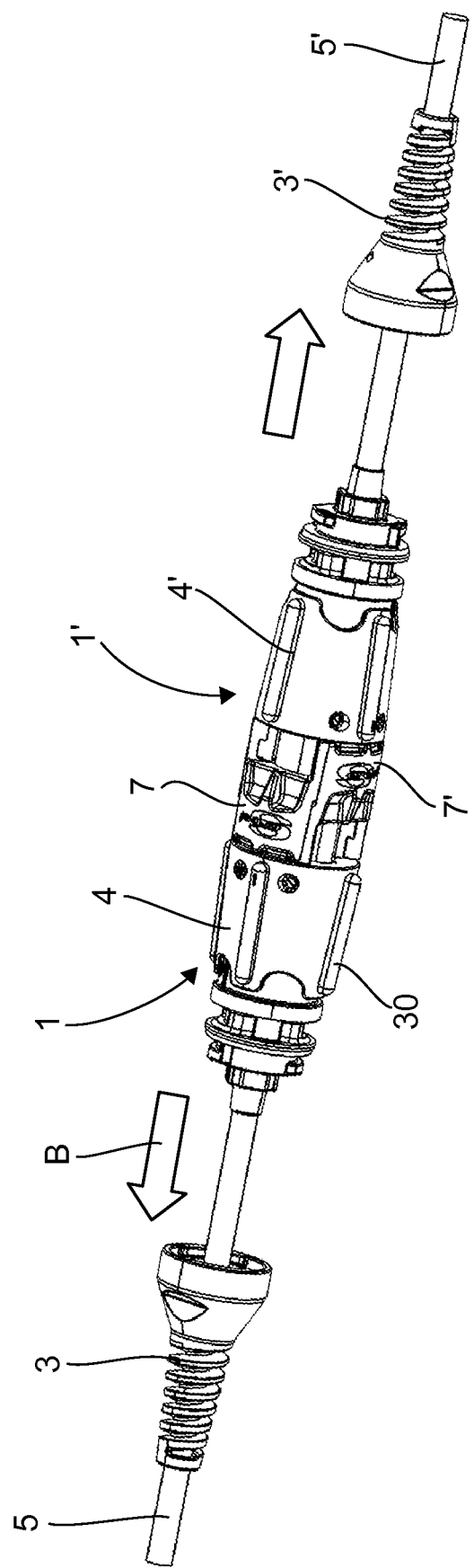
Figure 6:
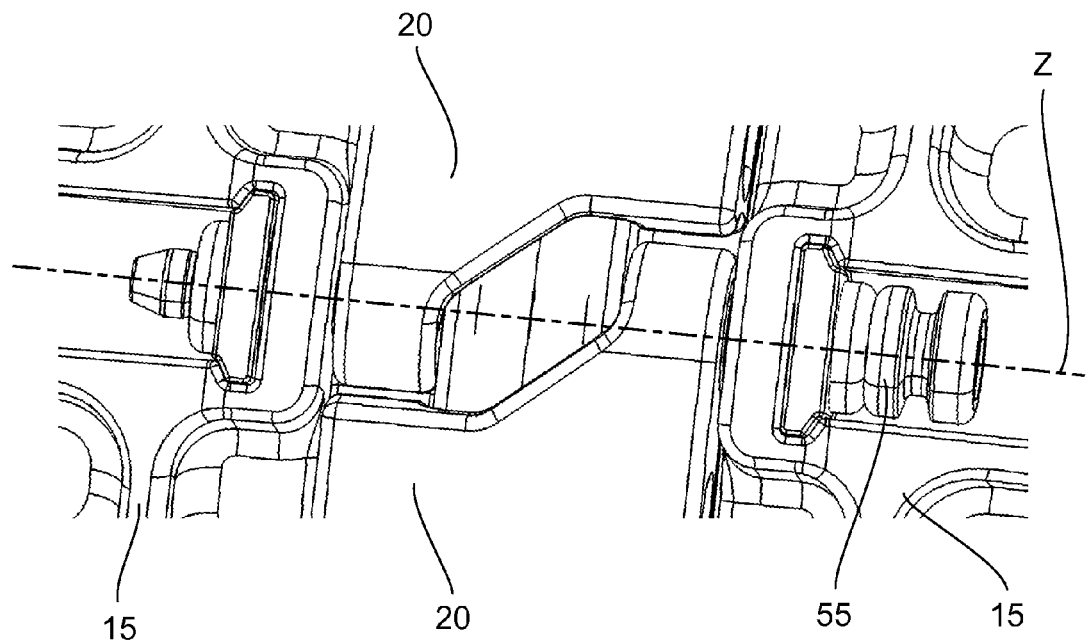
Figure 7:
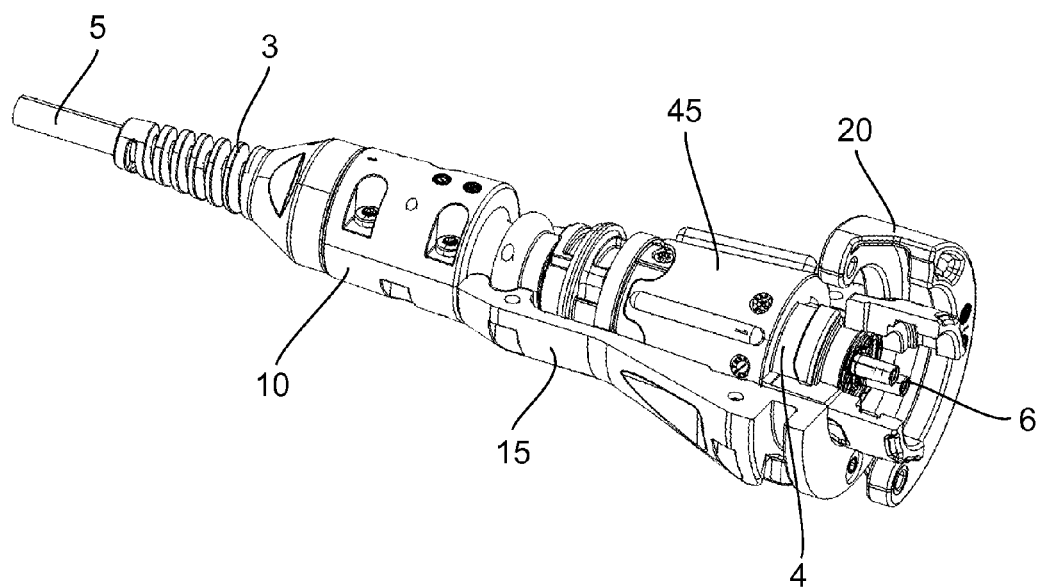
Figure 8A:
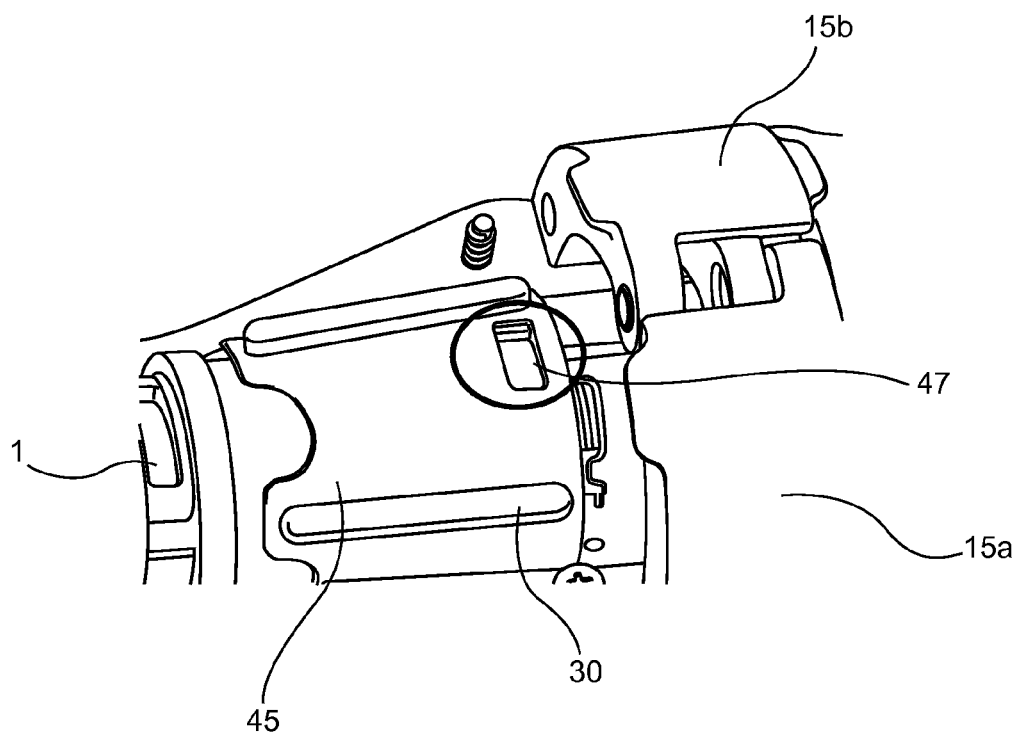
Figure 8B:
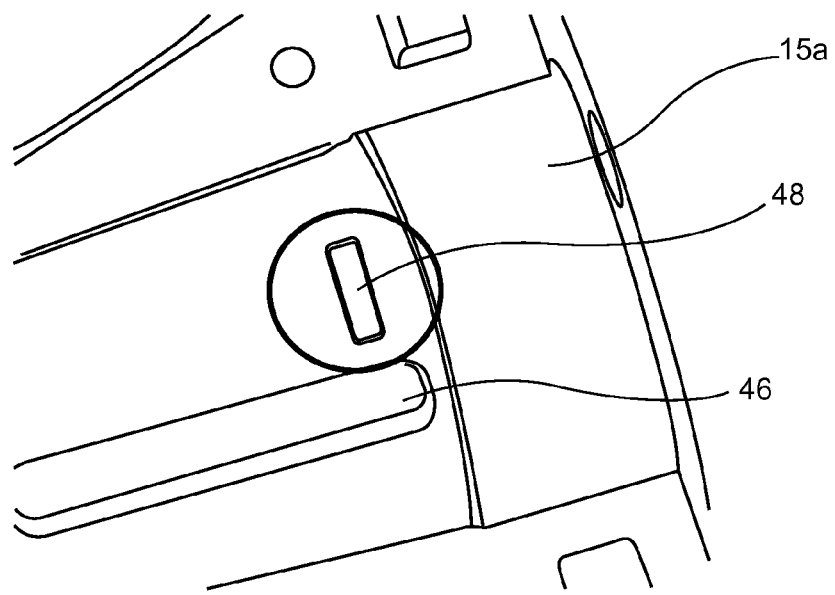
Figure 9:
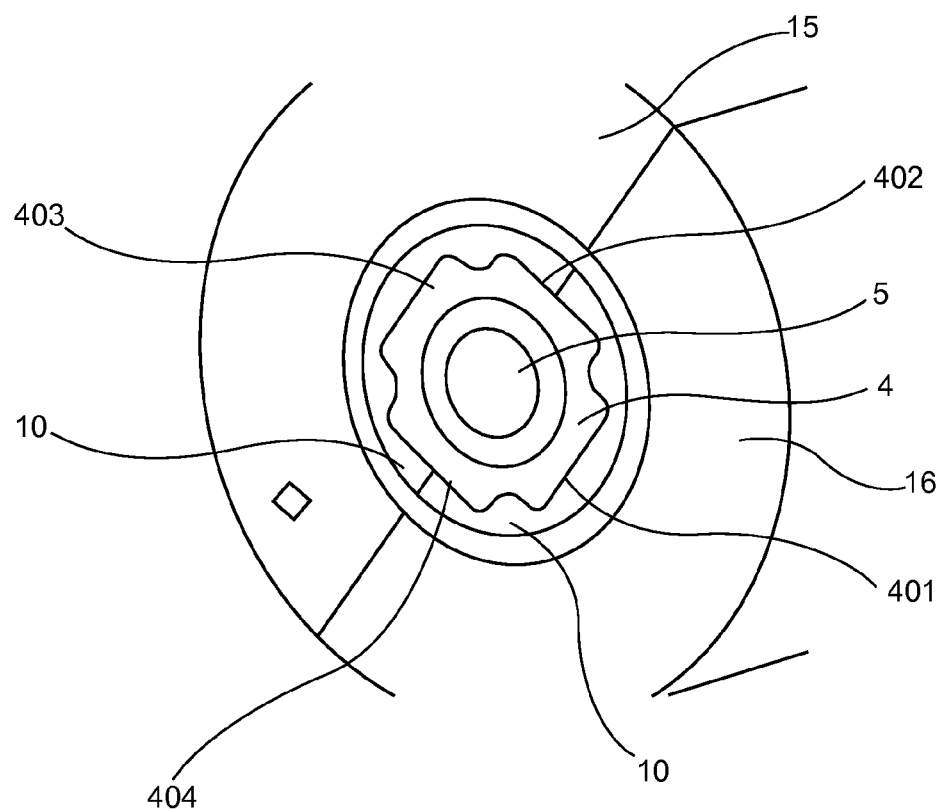
Figure 10:
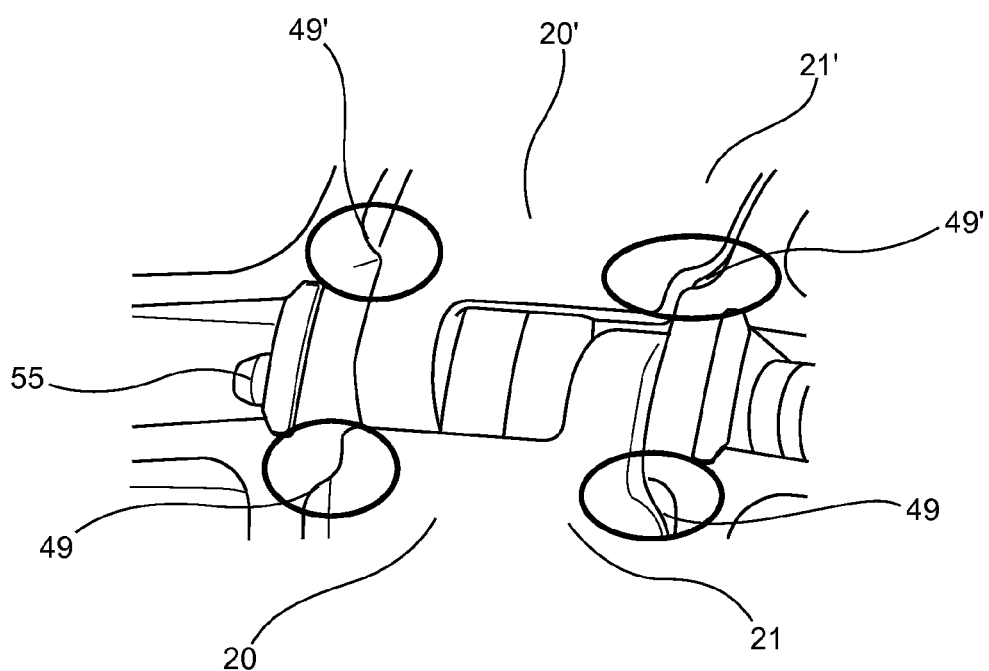
Figure 11:
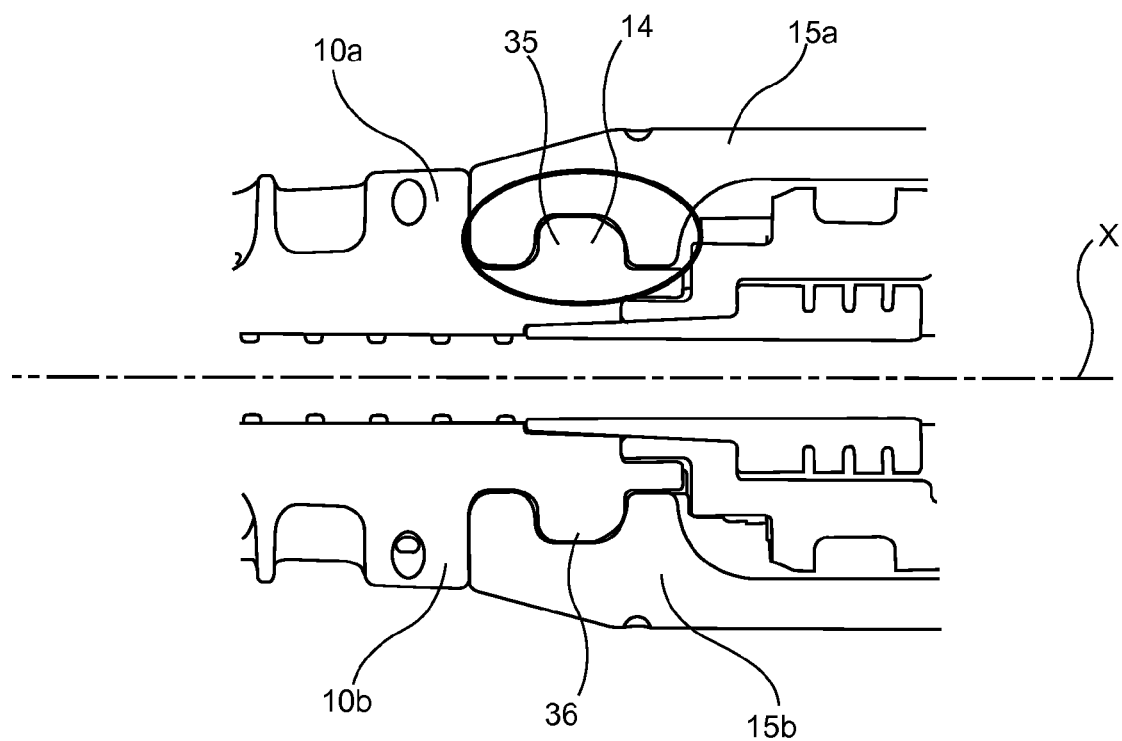

Other features and advantages of embodiments shall appear from the following description, given by way of an indicative and non-exhaustive examples and from the appended drawings, of which:

FIG. 1A is a schematic view in longitudinal cross section of two connectors which are connected to one another and receive respective stress relief devices according to an exemplary embodiment of the disclosure, FIG. 1B is a zoom of the frame C in FIG. 1A, FIG. 2 is a schematic perspective view of the connectors of FIG. 1A, FIG. 3 shows a schematic and perspective view of a connector, without stress relief device, FIG. 4 shows a schematic and perspective view of part of a stress relief device according to an exemplary embodiment of the disclosure, FIG. 5 is a schematic perspective view of two connectors which are connected and ready for receiving two respective stress relief devices according to an exemplary embodiment of the disclosure, the bend stiffeners being slid back off the connectors, FIG. 6 shows a partial schematic perspective view of an example of a locking system of the stress relief device according to an exemplary embodiment of the disclosure, FIG. 7 is a schematic perspective view of a connector with part of the stress relief device according to an exemplary embodiment of the disclosure, FIGS. 8A and 8B are partial and schematic views, in perspective, of another example of, respectively, a connector and a stress relief device according to an exemplary embodiment of the disclosure, FIG. 9 shows a schematic view in transversal cross section of another embodiment of the stress relief device according to the disclosure, viewed according to XI-XI of FIG. 1, FIG. 10 is a partial schematic perspective view of another embodiment of the disclosure, and FIG. 11 is a partial schematic view in longitudinal cross section of another embodiment of the disclosure.

5. DETAILED DESCRIPTION OF EMBODIMENTS

FIGS. 1A and 2 show a connector 1 with a stress relief device 2 according to an embodiment of the disclosure.

The connector 1 shown alone in FIG. 3 is an example of an existing connector, comprising a bend stiffener 3, a connector body 4 including a ring 45. The connector 1 is linked or connected to an end 70 of a cable 5 and extends generally along a longitudinal axis X.

The bend stiffener 3 is configured for sliding along the cable 5. The bend stiffener 3 is able to cooperate with the connector body 4, as shown in FIG. 3 and to be slid back off the connector body 4, remote from the connector body 4, as shown in FIG. 5. An operator can therefore disassemble the bend stiffener 3 from the connector body 4, pull the bend stiffener 3 backwards so as to place it in a remote position, in this example by sliding along the cable 5.

In this embodiment, the connector body 4 has a connection zone 6 including at least one electrical contact and a housing extending at least partly around the connection zone, comprising two protrusions 7 of generally cylindrical sector shape. The protrusions 7 are configured for cooperating with similar protrusions 7' of a complementary connector 1'. Such a cooperation is shown in FIG. 5 for example.

Once both connectors 1 and 1' connected to one another, the rings 45 and 45' are given a 90° turn relative to the rest of the connector 1 or 1', in this embodiment, so as to lock the connection. In other embodiments, not shown, the rotation of the rings 45 and 45' are higher than 90°, being equal for example to 720°, i.e. two complete rotations around the connector body 4.

In this embodiment, the connector 1 and the complementary connector 1' are hermaphrodite so that the connector 1 and the complementary connector 1' are similar connectors.

The connector 1, connected to the complementary connector 1' and to the cable 5 is suitable for 95% of the geophysical operations, especially seismic exploration operations, as it is suitable for dry areas.

However, for 5% of the geophysical operations, the equipment is to be used in transition areas in which, as specified above, there are high tensile and bending stresses, and for which the equipment is required to have high robustness and water-tightness up to 15 m deep.

In such a situation, the operators should adapt the connectors so as to provide them robustness and stress relief, before or during the operation, which is possible thanks to one or more embodiments of the present disclosure.

The principle of an exemplary embodiment includes adapting an existing connector so as to provide it with a stress relief device. This operation reinforces the connector without any change of connector, and only if and when necessary. The stress relief device 2 is detachably mountable on the connector 1, the stress relief device 2 being configured such that its mounting/dismounting does not require any change in the connection/disconnection of the connectors 1, 1' to one another. The stress relief device 2 may be configured for being substantially indefinitely fitted on the connector 1 and substantially indefinitely removed from the connector 1.

The stress relief device 2 is partially shown without any connector in FIG. 4. The stress relief device 2 includes an anchor 10. The stress relief device 2 also includes a shell 15 configured for being assembled on the anchor 10, partly shown in FIG. 4. The stress relief device also includes a locking system 20 configured for connecting and locking the shell 15 to a similar shell 15' of a similar stress relief device 2' for the complementary connector 1'. In FIG. 4, the locking system 20' of the similar stress relief device 2' is shown, being connected to the shell 15.

The connectors 1 and 1' equipped with the stress relief devices 2 and 2' can be seen in FIGS. 1A and 2.

In this example, the similar stress relief device 2' is identical to the stress relief device 2, both having hermaphroditic properties.

As shown, the anchor 10 is configured for being placed around a portion of the cable 5, near the end 70 of the cable 5, so as to allow a stress relief of the portion of the cable 5, said portion of the cable 5 being adjacent to the connector 1. The shell 15 is configured for at least partially wrapping the connector 1, as shown.

As can be seen in FIG. 2 for example, the anchor 10 includes two half-anchors 10a and 10b cooperating around the cable 5. The half-anchors 10a and 10b may be fastened to one another, as shown, for example with screws 11. The part of the anchor 10 in contact with the cable 5 presents, in this example, a plurality of bumps 12 so as to grip and anchor the cable 5. The anchor 10 acts as a clamp around the cable 5.

The anchor 10 is configured for cooperating at one end 13 with an end 8 of the bend stiffener 3. The anchor 10 is configured at another end 14 for cooperating with an end 16 of the shell 15 as described below.

The shell 15 includes in this embodiment two half-shells 15a and 15b cooperating around the connector 1. Only one half-shell 15b is shown in FIG. 4.

The two half-shells 15a and 15b are configured for being mounted in a rotationally fixed manner on the connector ring 45. In order to assure such a fixation, the shell 15, i.e. the half-shells 15a and 15b, include(s) longitudinal hollow portions 46, shown in the embodiment of FIG. 10, configured for cooperating with longitudinal bump portions 30 of the connector ring 45.

The shell 15, in particular the two half-shells 15a and 15b, are configured for creating an axial play 18 between the shell 15 and the connector 1, once the shell 15 is mounted on the connector 1. This axial play 18 is visible in FIG. 1A. This axial play 18 may substantially prevent any stress to transit through the connector 1 and the complementary connector 1'. The forces transmitted through the anchor 10 are therefore generally transmitted to the shell 15 and substantially not to the connector 1 and complementary connector 1'.

As described above, the anchor 10 includes an external surface having a shape 35, in this example an external tore surface, in this embodiment at the end 14. The shell 15 includes an external surface having a complementary shape 36, in particular a complementary hollow tore surface, in this embodiment at the end 16, so as to connect the shell 15 to the anchor 10. The shell 15 is free to rotate around the anchor 10 while being freezed axially relative to the anchor 10. In this embodiment, the shell 15 can therefore turn around the anchor 10 with the anchor fixed on the cable 5, as the shell 15 is mounted in a rotatable manner relative to the anchor 10. The tore surface 35 and the complementary hollow tore surface 36 are in this example placed perpendicular to the longitudinal axis X, being essentially symmetrical about the longitudinal axis X.

The locking system 20 includes in the shown embodiment a locking half-ring 21, said locking half-ring 21 being fastened to the shell 15 and being mounted in a rotatable manner relative to the shell 15 around an axis Y in a periphery of the shell 15. The axis Y is colinear to the longitudinal axis X, as shown in FIGS. 1A, 1B and 4. A screw 22 is configured for being inserted in a through opening 23 of the locking half-ring 21 and in a through opening 24 of the shell 15 so as to mount the locking half-ring 21 onto the shell 15 in a rotatable manner around the axis Y.

As shown in FIGS. 1A, 1B and 4, the shell 15 includes in this example, at an end 40 opposite to the end 16, a peripheral groove 41 for housing part of the locking half-ring 21 of the stress relief locking system 20 and part of the locking half-ring 21' of the similar stress relief locking system 20'. Still in this example, the locking half-ring 21 includes at least two curved inwardly projected ribs 42 and 43, i.e. a first rib 42 and a second rib 43. The first rib 42 is configured for cooperating with the peripheral groove 41 of the shell 15 and for being fastened to the shell 15', by the screw 22' in this example. The second rib 43 is configured for cooperating with the peripheral groove 41 of the shell 15' of the similar stress relief device 2', the ribs and grooves having complementary shapes, as shown.

The shell 15 has a through opening 50 in a lateral wall of the peripheral groove 41 and the second rib 43 has a through opening 51, said through openings 50 and 51 of the peripheral groove 41 and of the second rib 43 being configured for receiving a locking element 55 of the locking system 20 so as to lock the shell 15 to the shell 15' of the similar stress relief device 2'. It is to be noted that the peripheral groove 51' and the second rib 43' of the similar stress relief device 2' also have respective through openings 50' and 51', as visible especially in FIG. 1B.

In the embodiment of FIG. 6, the locking element 55 is a rod, as shown in FIG. 1A. The locking element 55 may also be a screw, a pin, an eccentric, or any similar device, without departing from the scope of the present disclosure and/or the appended claims. In another embodiment, a rotational spring could be installed around screws 22 inducing a torque on the locking ring 20. By this mean, locking rings are kept in position under the pressure created by the rotational spring. It has to be noted that solutions listed above could be implemented jointly with the rotational elements in order to secure the assembly.

The locking system 20 has to be turned around the axis Y so as to place the second rib 43 in the complementary peripheral groove 41 of the complementary shell 15, as shown with the arrow A in FIG. 4.

The locking element 55 extends along an axis Z parallel to the longitudinal axis X, as shown. As can be seen in FIG. 8, the locking element 55 crosses the shells 15 and 15' and locking systems 20 and 20' of both stress relief devices 2 and 2', so as to lock them to one another. This locking element 55 therefore prevents the connector 1 from disconnecting from the complementary connector 1'.

One example of a schematic way of the stresses in the stress relief device 2 and the similar stress relief device 2' is shown in dotted lines in FIG. 1A. It can be seen that the stresses pass from the cable 5 to the anchor 10, then to the shell 15 and then to the similar shell 15' and to the similar anchor 10' to the cable 5'. The stresses do not substantially pass through the connector 1 and the connector 1', thanks to the stress relief device. It should be noted however that even if the great majority of the stresses pass through the stress relief devices 2 and 2', the friction between the connectors 1 and 1' may create some tensile stress between connector rings 45 and 45'.

The method for adding the stress relief device 2 to the existing connector 1 includes the following steps:
  pulling backwards the bend stiffener 3 along the cable 5, as shown in FIG. 5 according to the arrow B,
  assembling the anchor 10 of the stress relief device 2 around the cable 5 between the bend stiffener 3 and the connector body 4,
  making the bend stiffener 3 sliding forward along the cable 5 so as to engage with the anchor 10,
  assembling the shell 15 to the anchor 10 and to the connector body 4, as partially shown in FIG. 7, the locking system 20 being fastened to the shell 15, in this example thanks to the screw 22.

The connector 1 is generally already connected to a complementary connector 1', so that both connectors 1 and 1' are equipped with similar stress relief devices 2 and 2'. The stress relief devices 2 and 2' are locked to one another thanks, in this embodiment, to a turn of the locking system 20 and to the locking element 55 crossing both locking systems 20 and 20' of the stress relief devices 2 and 2'.

Of course, the present disclosure also includes a method for dismounting the stress relief device 2 from the connector 1 as defined above, comprising the following steps:
  unlocking the locking system(s) 20 and 20',
  dismounting the shell 15,
  dismounting the anchor 10,
  pulling forwards the bend stiffener 3 so as to engage with the connector body 4.

Other embodiments are provided, still in the scope of the present disclosure. For example, in a particular embodiment, the stress relief device 2 may have a locking system 20 including a locking ring to be screwed so as to lock the stress relief device 2 to the similar stress relief device 2'.

In the embodiment of FIGS. 8A and 8B, the connector ring 45 and the shell 15 have a mechanical coding, in this example, in form of a recess 47 on the connector ring and in form of a corresponding projecting portion 48 on the shell, especially on an inner surface 61 of the shell 15, in order to ensure correct positioning of the shell, i.e. of the half-shell 15a (and 15b), onto the connector ring 45.

In the embodiment of FIG. 9, the design of the connector body 4 is arranged so that plane surfaces 401, 402, 403, 404 cooperates with corresponding surfaces on anchor 10 so that no rotation of the anchor in the connector body 4 can occur. In case it could, the cable 5 would have been twisted increasing the risk of damage. This rotation could occur when rotating the shells 15 and 16 around the connector body 4.

In the embodiment of FIG. 10, the locking half-rings 21 and 21' include ramps 49 and 49', respectively, on both lateral sides, so as to allow unlocking of the locking half-rings with a rotation of the device.

FIG. 11 shows another example of half-anchors 10a and 10b and half-shells 15a and 15b. The half-anchors 10a and 10b have a shape 35 of the external surface at the end 14, which extends circularly around the longitudinal axis X, but is not symmetrical relative to a transverse plane to the longitudinal axis X, as shown. The complementary shape 36 of the half-shells 15a and 15b corresponds to this non-symmetrical shape. This non-symmetrical shape aims at providing a stress parallel to the longitudinal axis X when a tensile stress along the longitudinal axis X is applied. A portion of this shape is perpendicular to the longitudinal axis X so as to be in opposition to the tensile stress along this longitudinal axis X.

In the specification and claims, the expression "includes a" has to be understood as meaning "includes at least one", unless expressly written.

An exemplary embodiment of the disclosure provides a technology that prevents any stress on the connectors, in particular in a transition area during an operation.

An exemplary embodiment of the disclosure increases the tensile strength of the connector, especially only when it is necessary.

An exemplary embodiment of the disclosure provides a system that will not change the mating principle of the connection.

An exemplary embodiment of the disclosure provides a system that will not affect the hermaphroditic properties of the connectors if any.

Although the present disclosure has been described with reference to one or more examples, workers skilled in the art will recognize that changes may be made in form and detail without departing from the scope of the disclosure and/or the appended claims.

The invention claimed is:

1. A stress relief device for a connector, said connector being assembled on an end of a cable and being configured for cooperating with a complementary connector along a longitudinal axis, said stress relief device including:
  an anchor configured for being placed around a portion of the cable so as to allow a stress relief of the portion of the cable, said portion of the cable being adjacent to the connector,
  a shell configured for being connected to the anchor and for at least partially wrapping the connector,
  a locking system configured for connecting and locking the shell to a similar shell of a similar stress relief device for the complementary connector, said stress relief device being detachably mountable on the connector, the stress relief device being configured such that its mounting/dismounting does not require any change in the connection/disconnection of the connectors to one another.

2. The stress relief device according to claim 1, wherein the anchor includes two half-anchors cooperating around the cable.

3. The stress relief device according to claim 1, wherein the shell includes two half-shells cooperating around the connector.

4. The stress relief device according to claim 1, the connector including a connector ring that ensures mating to the complementary connector, wherein the shell is configured for being mounted in a rotationally fixed manner on the connector ring.

5. The stress relief device according to claim 4, wherein the shell includes longitudinal hollow portions, respectively bump portions, configured for cooperating with longitudinal bump portions, respectively hollow portions of the connector ring.

6. The stress relief device according to claim 4, wherein the connector ring and the shell have a mechanical coding, in particular in a form of a recess on the connector ring and in a form of a corresponding projecting portion on the shell.

7. The stress relief device according to claim 1, wherein the shell is configured for creating an axial play between the shell and the connector, once the shell mounted on the connector.

8. The stress relief device according to claim 1, wherein the anchor includes an external surface having a shape, in particular an external tore surface, and the shell includes an external surface having a complementary shape so as to connect the shell to the anchor.

9. The stress relief device according to claim 1, wherein the locking system includes a locking half-ring, said locking half-ring being fastened to the shell and being mounted in a rotatable manner relative to the shell around a longitudinal axis in a periphery of the shell.

10. The stress relief device according to claim 9, wherein the locking half-ring includes ramps on both lateral sides.

11. The stress relief device according to claim 9, wherein the shell includes a peripheral groove for housing part of the locking half-ring of the stress relief locking system and part of the locking half-ring of the similar stress relief locking system.

12. The stress relief device according to claim 11, wherein the locking half-ring includes at least two curved inwardly projected ribs, including a first rib and a second rib, the first rib being configured for cooperating with the peripheral groove of the shell and for being fastened to the shell, and the second rib being configured for cooperating with the peripheral groove of the similar shell of the similar stress relief device, the ribs and grooves having complementary shapes.

13. The stress relief device according to claim 12, wherein the shell has a through opening in a lateral wall of the peripheral groove and the second rib has a through opening, said through openings of the peripheral groove and of the second rib being configured for receiving a locking element of the locking system so as to lock the shell to the similar shell.

14. The stress relief device according to claim 13, wherein the locking element is chosen from the group consisting of a rod, a screw, a pin, an eccentric and similar devices.

15. The stress relief device according to claim 1, the stress relief device and the similar stress relief device being identical devices.

16. The stress relief device according to claim 1, the stress relief device and the similar stress relief device having hermaphroditic properties.

17. A pair of stress relief devices according to claim 1.

18. An assembly of a connector and a complementary connector with a pair of stress relief devices according to claim 17.

19. An assembly comprising:
first and second plugged connectors, said connectors being assembled on ends respective cables and connected together along a longitudinal axis;
first and second stress relief devices, each comprising:
an anchor configured for being placed around a portion of a respective cable so as to allow a stress relief of the portion of the cable, said portion of the cable being adjacent to the respective connector,
a shell configured for being connected to the anchor and for at least partially wrapping the respective connector,
a locking system configured for connecting and locking the shell to the shell of the other stress relief device of the other connector,
said stress relief device being detachably mounted on the respective connector, the stress relief device being configured such that its mounting/dismounting does not require any change in the connection/disconnection of the first and second connectors to one another, and
wherein the first and second stress relief devices are configured so that an electrical connection between the first connector and the second connector is made through handling and mounting of the first and second stress relief devices on the first and second connectors, respectively, until a connection of the first stress relief device to the second stress relief device is realized.

* * * * *